(12) United States Patent
Rixen et al.

(10) Patent No.: US 9,368,949 B2
(45) Date of Patent: Jun. 14, 2016

(54) CHANNEL SYSTEM

(71) Applicants: Wolfgang Rixen, Solingen (DE); Gerrit Pies, Solingen (DE)

(72) Inventors: Wolfgang Rixen, Solingen (DE); Gerrit Pies, Solingen (DE)

(*) Notice: Subject to any disclaimer, the term of this patent is extended or adjusted under 35 U.S.C. 154(b) by 0 days.

(21) Appl. No.: 14/411,531

(22) PCT Filed: Jun. 24, 2013

(86) PCT No.: PCT/EP2013/001848
§ 371 (c)(1),
(2) Date: Dec. 29, 2014

(87) PCT Pub. No.: WO2014/000877
PCT Pub. Date: Jan. 3, 2014

(65) Prior Publication Data
US 2015/0162732 A1   Jun. 11, 2015

(30) Foreign Application Priority Data
Jun. 29, 2012  (DE) .......................... 10 2012 013 034

(51) Int. Cl.
*H01R 4/24* (2006.01)
*H02G 3/10* (2006.01)

(52) U.S. Cl.
CPC .............. *H02G 3/105* (2013.01); *H01R 4/2437* (2013.01)

(58) Field of Classification Search
CPC ...... H01R 25/14; H01R 31/06; H01R 25/006; H01R 4/2404; H01R 12/59; H01R 13/443; H01R 13/501; H01R 13/506
See application file for complete search history.

(56) References Cited

U.S. PATENT DOCUMENTS

| | | | |
|---|---|---|---|
| 5,967,818 A | | 10/1999 | Carron et al. |
| 5,998,732 A | * | 12/1999 | Caveney ................. H02G 3/105 174/481 |
| 6,350,135 B1 | * | 2/2002 | Acklin ..................... H01R 4/34 174/494 |
| 6,848,933 B1 | * | 2/2005 | Delaney, III ......... H01R 4/2404 439/392 |

FOREIGN PATENT DOCUMENTS

| | | |
|---|---|---|
| DE | 84 09 982 U1 | 7/1985 |
| DE | 299 10 342 U1 | 9/1999 |
| DE | 199 32 561 A1 | 2/2001 |
| EP | 2 280 466 A1 | 2/2011 |
| FR | 2 097 279 | 3/1972 |
| WO | 2009/095871 A1 | 8/2009 |

* cited by examiner

*Primary Examiner* — Xuong Chung Trans
(74) *Attorney, Agent, or Firm* — Gudrun E. Huckett

(57) ABSTRACT

The invention relates to a channel system (10) comprising at least one first channel provided with a flat multicore cable and a socket (14) connected thereto, said channel having a back side, a bottom side, and a front side provided with a front cover that can be detachably fastened thereto, and having a detachably fastened upper covering, which is removed in the area of the mounted socket (14). The channel system is characterized in that the electrical contact between the flat cable and the socket (14) is established by way of an insulation displacement connector (26), the first part of which is resting on the flat cable, and the second part thereof, which includes the insulation displacement contacts, is arranged on the socket (14), and in that the socket (14) is detachably mounted.

16 Claims, 16 Drawing Sheets

CHANNEL SYSTEM

BACKGROUND OF THE INVENTION

The invention concerns a channel system comprising at least one first channel comprising a multicore flat cable and an electrical socket connected thereto and provided with a rearward side, a bottom side as well as an existing front side with a front cover that is detachably attachable thereto, and comprising a detachably attached upper cover that is removed in the area of the detachably attached electrical socket.

Recently, the need for such channel systems has risen more and more. This has several reasons. On the one hand, in old buildings, no new slots must be produced in order to lay the appropriate conduits.

On the other hand, many new houses are produced in modular construction for which it is not possible to already determine beforehand, for example, in prefabricated houses, the position of individual electrical sockets or other electrical elements. It is particularly important, not only in renovations of old buildings, but also when planning new buildings, to be able to supply the great number of electrical devices appropriately.

In this context, presently available are only channel systems that can be provided with electrical sockets which however no longer allow for free position selection for mounting.

The invention has therefore the object to provide a channel system of the aforementioned kind that with a few simplest means enables a high flexibility of the arrangement, in particular of electrical sockets.

SUMMARY OF THE INVENTION

This object is solved according to the invention for a channel system of the aforementioned kind in that the electrical contact between the flat cable and the electrical socket is realized by means of an insulation piercing connector whose first part is resting on the flat cable and whose second part which is provided with the insulation piercing contact is arranged on the electrical socket and in that the electrical socket is detachably attached.

The gist of the invention resides in that with very minimal expenditure at least one first channel receiving a multicore flat cable is made available which can be easily surface-mounted.

The main advantage resides in that by means of the afore described channel system it is possible to mount at any location a functioning electrical socket with simplest and thus very safe manipulation steps.

In this context, a special feature resides in that the insulation piercing connector is of a two-part configuration wherein the first part can be pushed simply onto the region of the flat cable in contour conformity and serves as a guide for the insulation piercing contacts. These insulation piercing contacts are arranged in the second part of the insulation piercing connector, namely in such a way that they are brought into contact with the contact pins for the electrical socket. Accordingly, the second part is connected prior to mounting with the residual electrical socket. It is only required to connect the two parts of the insulation piercing connector with each other. Accordingly, the first and second parts are formed such that, after latching, they cannot be disassembled anymore. This latching action is therefore a so-called irreversible latching action.

Accordingly, attachment of an electrical socket is possible in a simplest manner, namely due to the aforementioned constructive features.

So that the insulation piercing connector, in particular the first part, can no longer be removed after having been installed once, it is advantageous when the insulation piercing connector is connected irreversibly with the channel, in particular by means of appropriate latching devices. Accordingly, the introduced insulation piercing connector is essentially like a "bandage", however with the great difference that it can be reused at any time for connecting an electrical socket. For this purpose, it is only necessary that the appropriate electrical socket housing with the contact pins engages the appropriate openings between the first and second parts of the insulation piercing connector.

Therefore, it is advantageous when the non-piercing ends of the insulation piercing connectors within the second part are electrically conductingly connected with the contact pins arranged within the electrical socket in a detachable way.

An advantageous embodiment of the invention provides that the second part is locked irreversibly with the first part after the electrical socket has been pivoted in the direction of the channel and, at the same time, the insulation piercing contacts have penetrated into the flat cable.

In this context, there are, of course, several pivoting possibilities, namely for an already attached first channel there are three possibilities. It is therefore advantageous when the electrical socket has been pivoted in the direction of the longitudinal axis of the channel either clockwise, counterclockwise, or transverse to the direction of the longitudinal axis of the channel for mounting.

As already briefly mentioned above, it is also advantageous when the electrical socket is removable from the channel and the second part remains latched irreversibly with the first part and covers the ends of the insulation piercing contacts pointing away from the flat cable.

For a better securing action of the mounted electrical socket, it is advantageous when the electrical socket has a fastening profile that is connectable with the channel, that either supports an electrical socket housing in its interior or at least partially receives it, wherein the surfaces of the electrical socket housing that are pointing in the channel direction are free of any fastening profiles.

When as a flat cable a three-core cable should be employed which comprises a zero conductor, it is advantageous for safety reasons when this zero conductor, when mounting the electrical socket, is connected first with the appropriate insulation piercing contact with the electrical socket and the two other conductors then follow. For this purpose, it is then advantageous when the bottom side is profiled such that the matching surface of the multicore flat cable that is facing the bottom side can be joined only in a predetermined orientation so that an arrangement of the adjacently positioned cable strands of the flat cable is always the same. In this way, the position of the zero conductor is thus always defined.

When configuring the electric current distribution systems, in particular the electrical sockets at the desired positions, it is sometimes desirable, in case of those consumers of electricity that receive their signals by means of cable, to incorporate them into the cable system. In this context, it is then advantageous when a receiving possibility is provided by means of a second channel which is extending away from the bottom side opposite to the cover.

This second channel can also be closed off by the front cover in a detachable way.

It may moreover be desirable to accommodate additionally also heating conduits within the channel system, namely not only for visual appearance reasons. The channel system has additionally also a large surface area which can be employed as a radiation source for the heating pipes or their heat energy.

In this connection, a third channel is then advantageous which is provided in its interior with holding elements for heating conduits and adjoins either the first channel or the second channel.

Even though the fastening profile has a satisfactory strength by means of the appropriate latching action which is not irreversible, with the first channel, it is still advantageous when the fastening profile in the first channel is braced by means of a securing screw.

Furthermore, it is possible that the first channel is formed monolithically either with the second channel or/and with the third channel.

A particularly good forced guiding action for the pivot movement of the electrical socket when being mounted on the channel system is provided in that the first part is connected by means of a film hinge with the second part of the insulation piercing connector.

Of course, with the exception of the flat cable, the material of the cable system is comprised of metal, plastic material or a combination thereof.

BRIEF DESCRIPTION OF THE DRAWINGS

Further features and advantages of the invention result from the following Description of two embodiments as well as from the Figures to which reference is being had. It is shown in.

DESCRIPTION OF PREFERRED EMBODIMENTS

Figure 1:
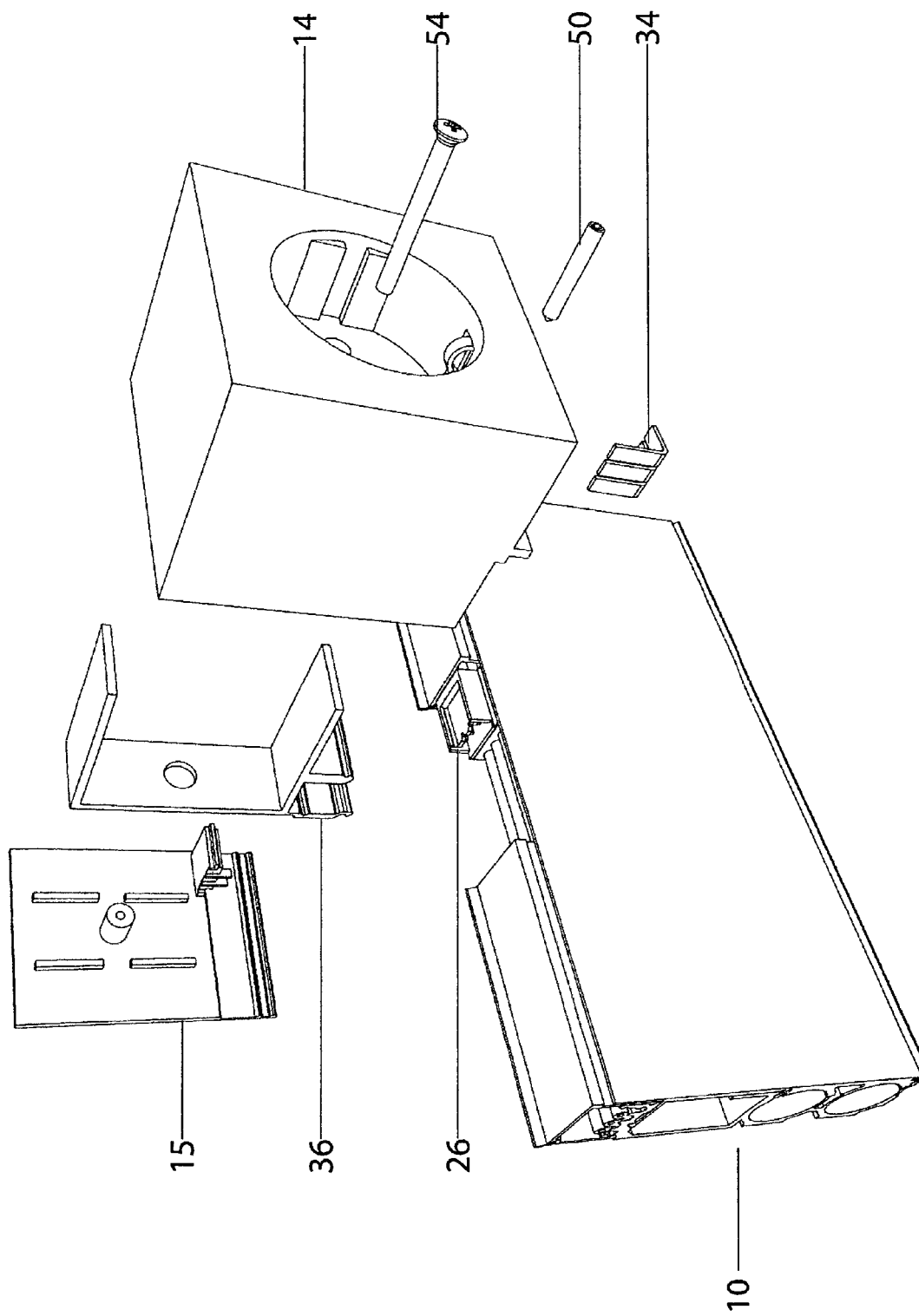
FIG. 1 an exploded illustration of a first embodiment of the channel system with electrical socket.
Figure 2:
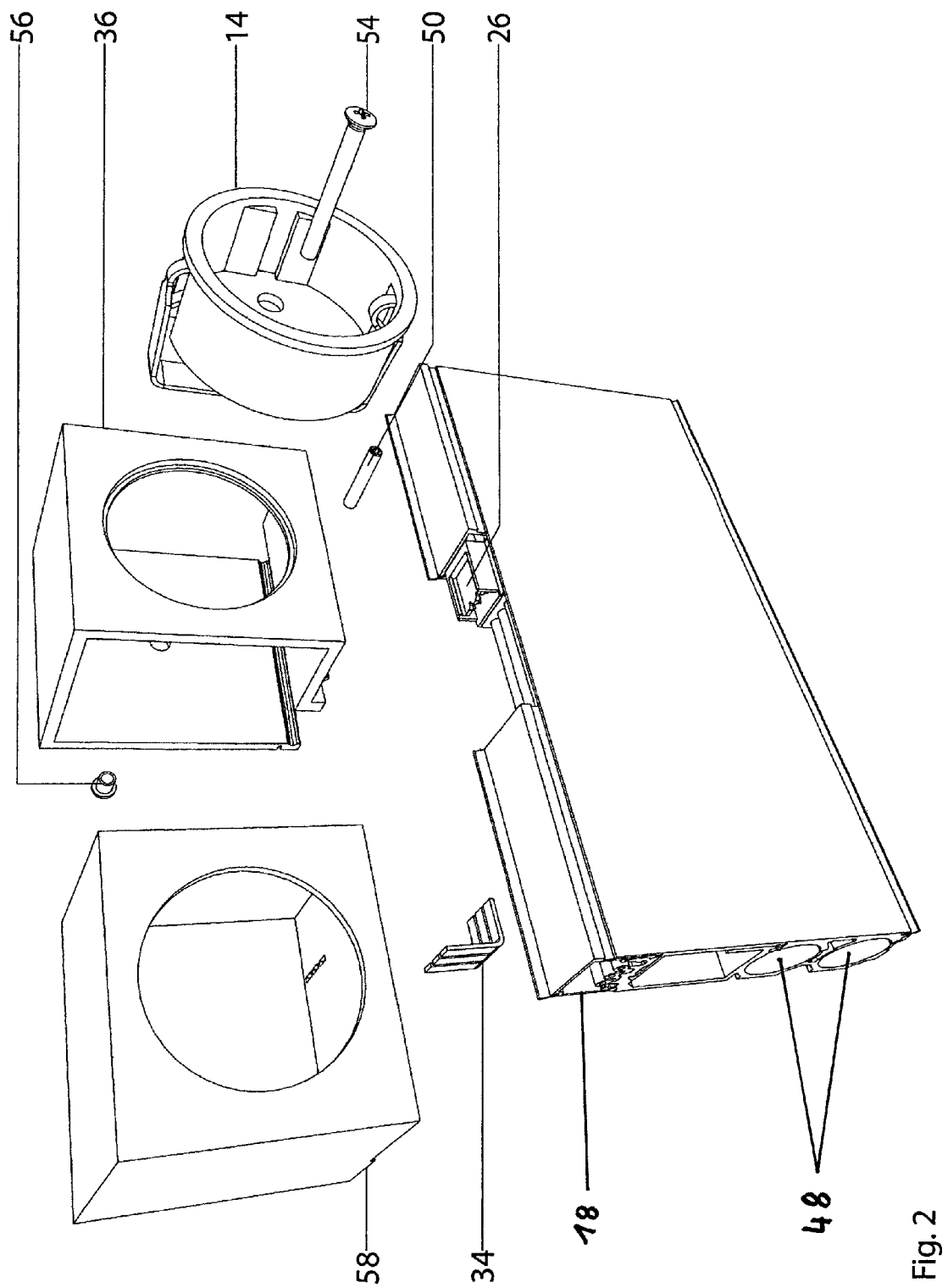
FIG. 2 an exploded illustration of a second embodiment of the channel system with electrical socket.

With the aid of FIGS. 1 through 14, two embodiments of a first to third channel 16, 42, and 44 which are present in both embodiments will be described. Same reference characters mean same features inasmuch as nothing to the contrary is indicated.

Of course, the following description, at least the appropriate parts, also applies to a channel system 10 with only a first channel 16, or a first and second channel 16 and 42, or a first and third channel 44. The main focus is therefore on the first channel 16 which is provided with a flat cable 12 that in this case has three cable strands 40.

The cable systems 10 which will now be described contain each at least one multicore flat cable 12 to which is connected an electrical socket 14 at the first channel 16.

The first channel 16 has a rearward side 18, a bottom side 20, and a front side 21.

Of course, the rearward side 18, the bottom side 20, and the front side 21 can be connected either individually or also connected monolithically to the bottom side 20, namely by means of latching/inserting connections. In the described embodiments, however, the rearward side 18 and the front side 21 are monolithically connected with an upper cover 24 so that the bottom side 20, which receives the flat cable 12, in the instant case a three-core cable, is latched with the above described parts for forming the first channel 16.

Figure 3:
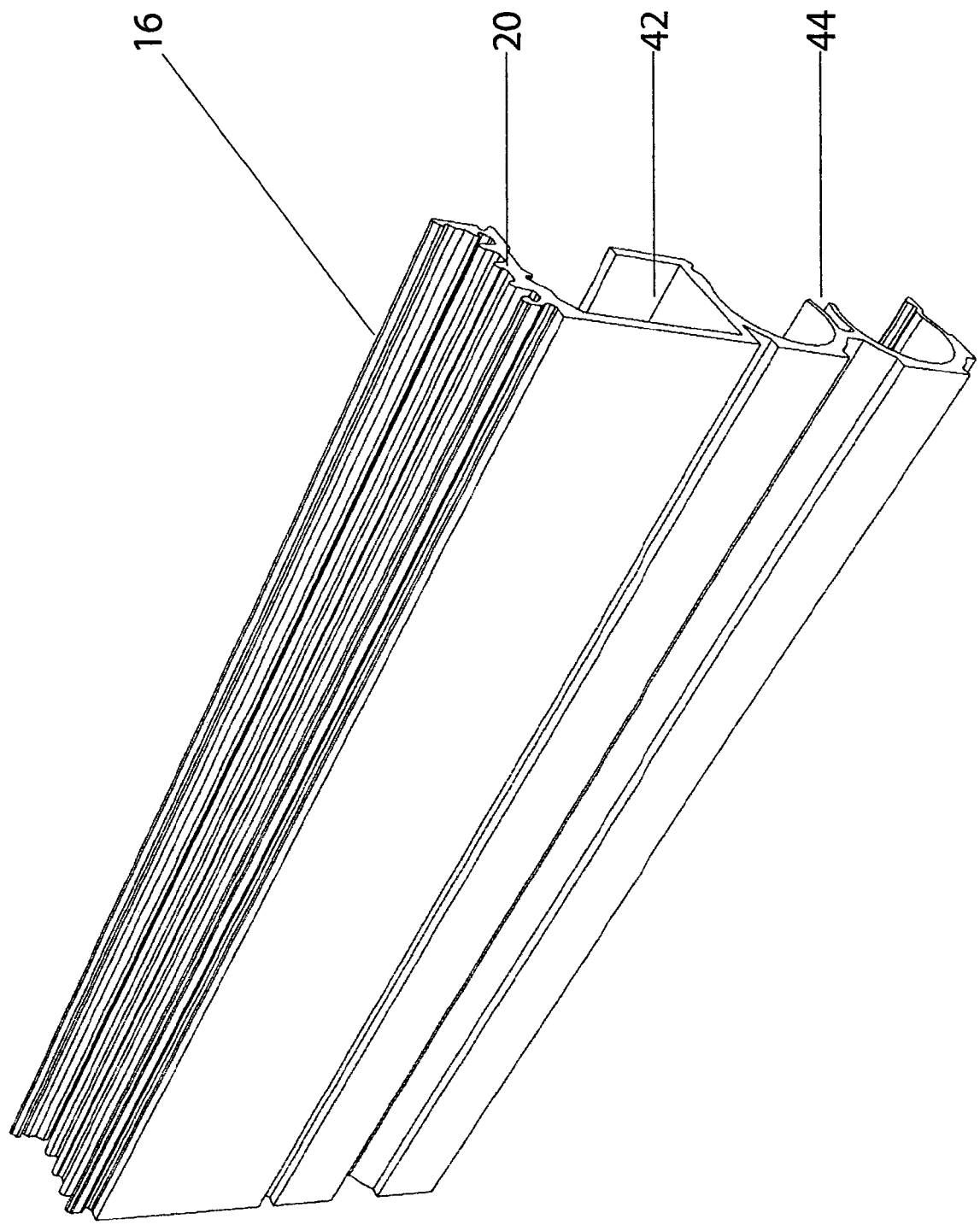
FIG. 3 first through third channels of the channel system without add-ons.
Figure 3A:
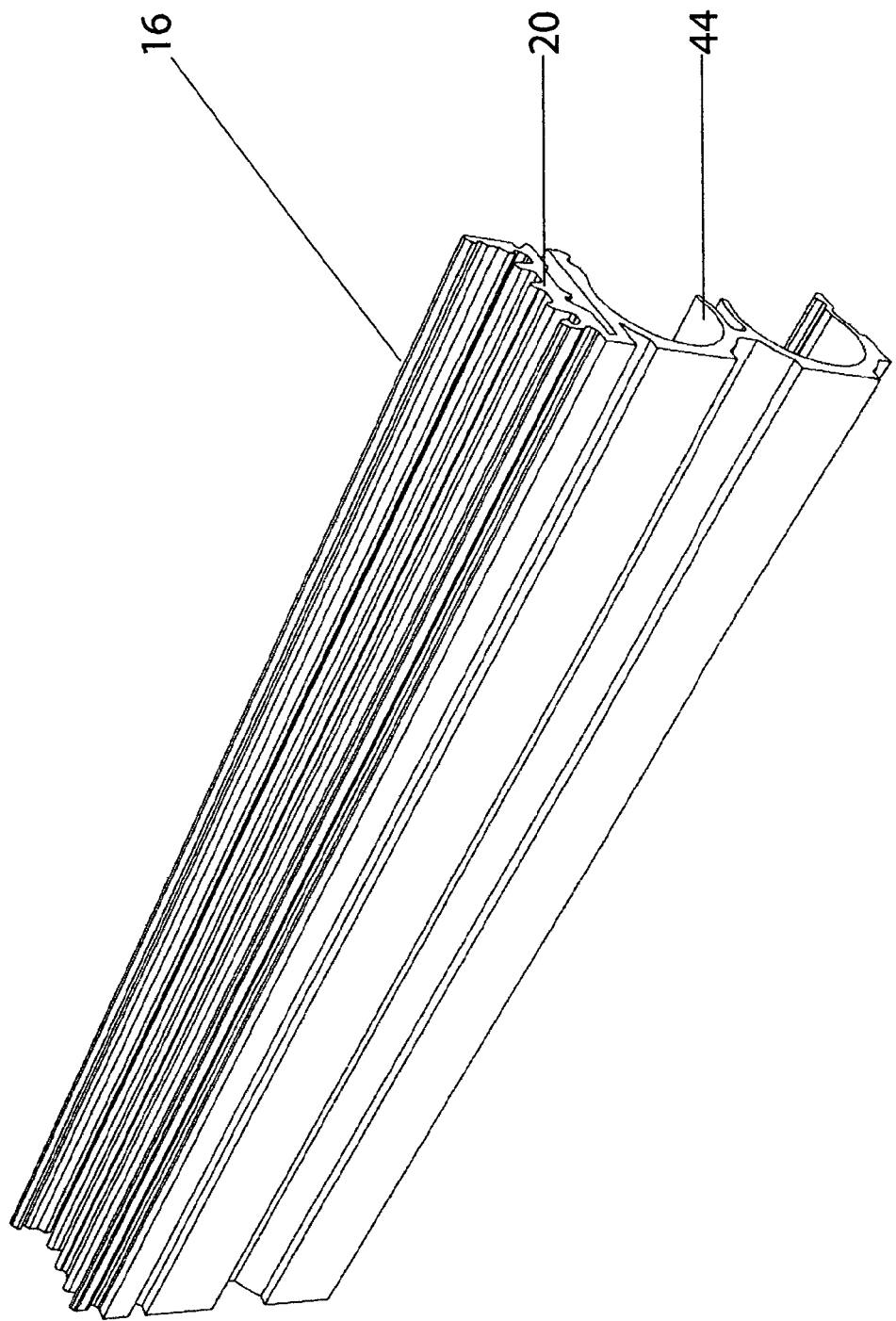
Figure 3B:
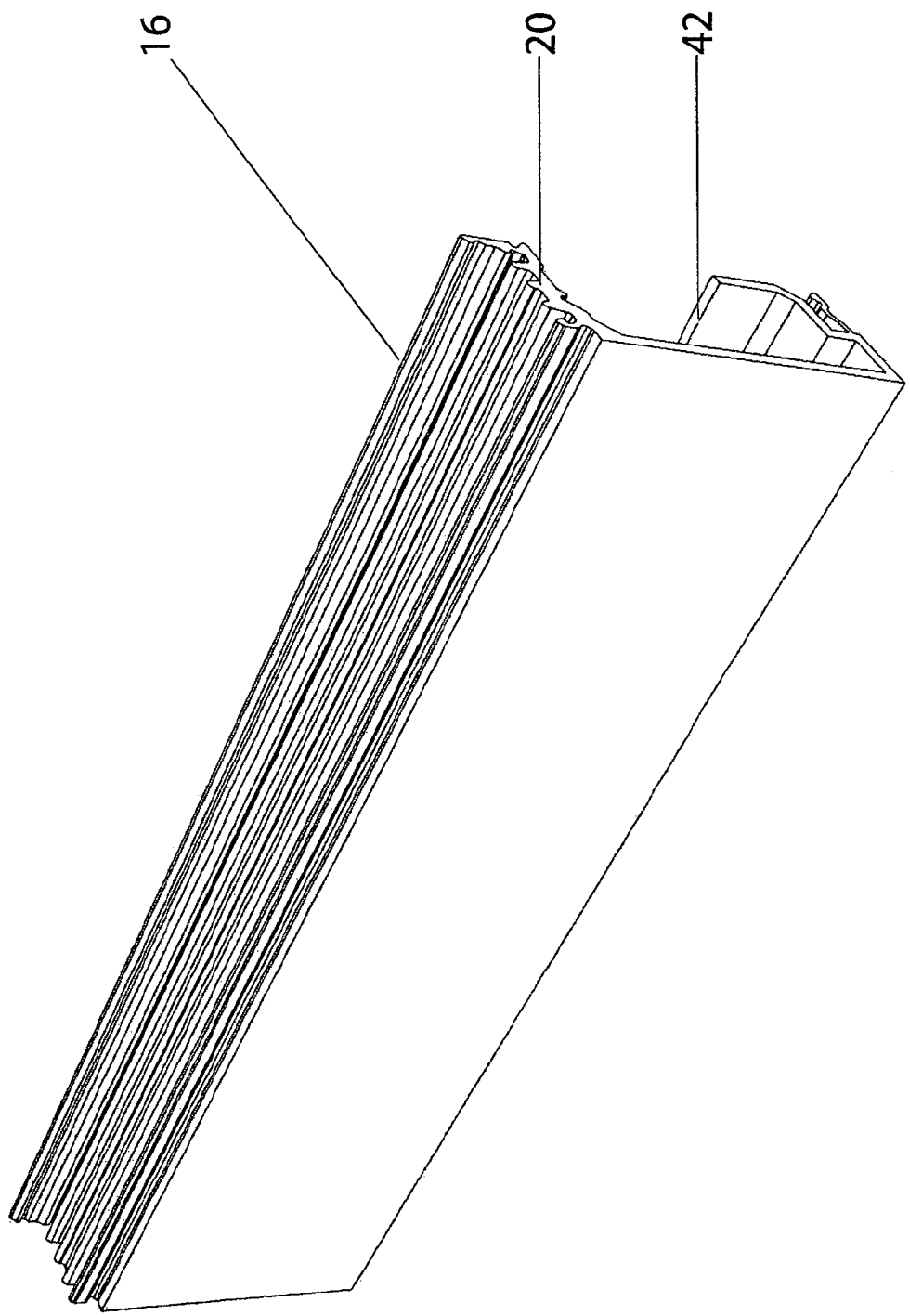
Figure 4:
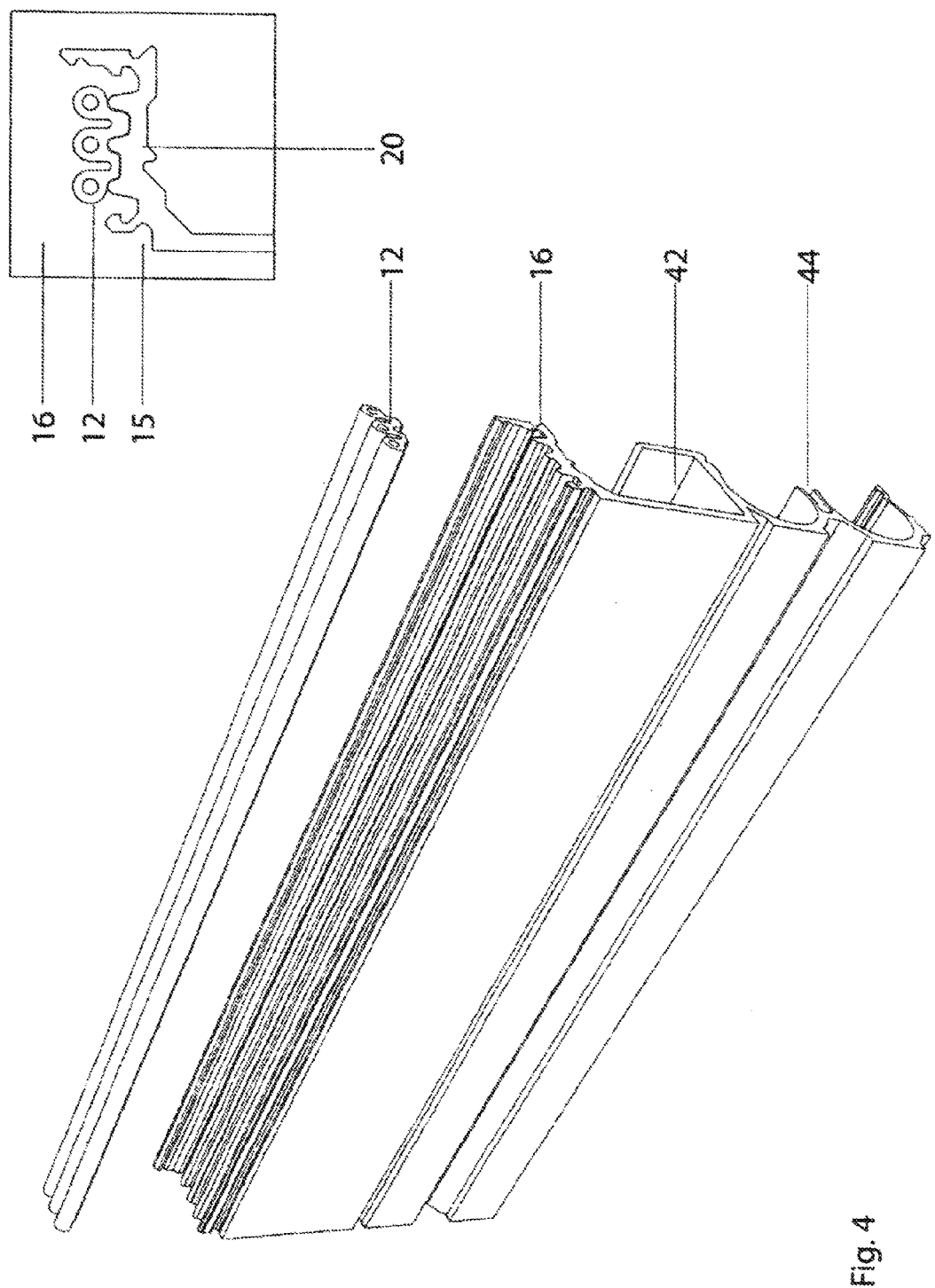
FIG. 4 an illustration similar to FIG. 3 with additional flat cable prior to insertion into the channel.

In particular FIG. 3 shows that the bottom side 20 of the first channel 16 for receiving the flat cable 12 is provided with a certain profiling that, as shown in particular in FIG. 4, is asymmetrically designed in cross-section. The surface of the flat cable facing the bottom side 20 has a negative contour relative to the bottom side 20 so that, in order to obtain a flat top surface of the inserted flat cable 12, there is only one position for placing the flat cable 12 onto the bottom side 20.

The reason for this is that for a correct electrical connection with the electrical socket 14, the cables to be connected must have a certain configuration. Of course, the sequence of the cable strands which are positioned adjacent to each other is arbitrary; however, in the illustrated embodiments the zero conductor is arranged such that it is closest to the front side 21 so that, upon pivoting and piercing of the electrical socket 14 and the insulation piercing contacts 30, the zero conductor is contacted first by the electrical socket 14 for safety reasons.

Figure 5:
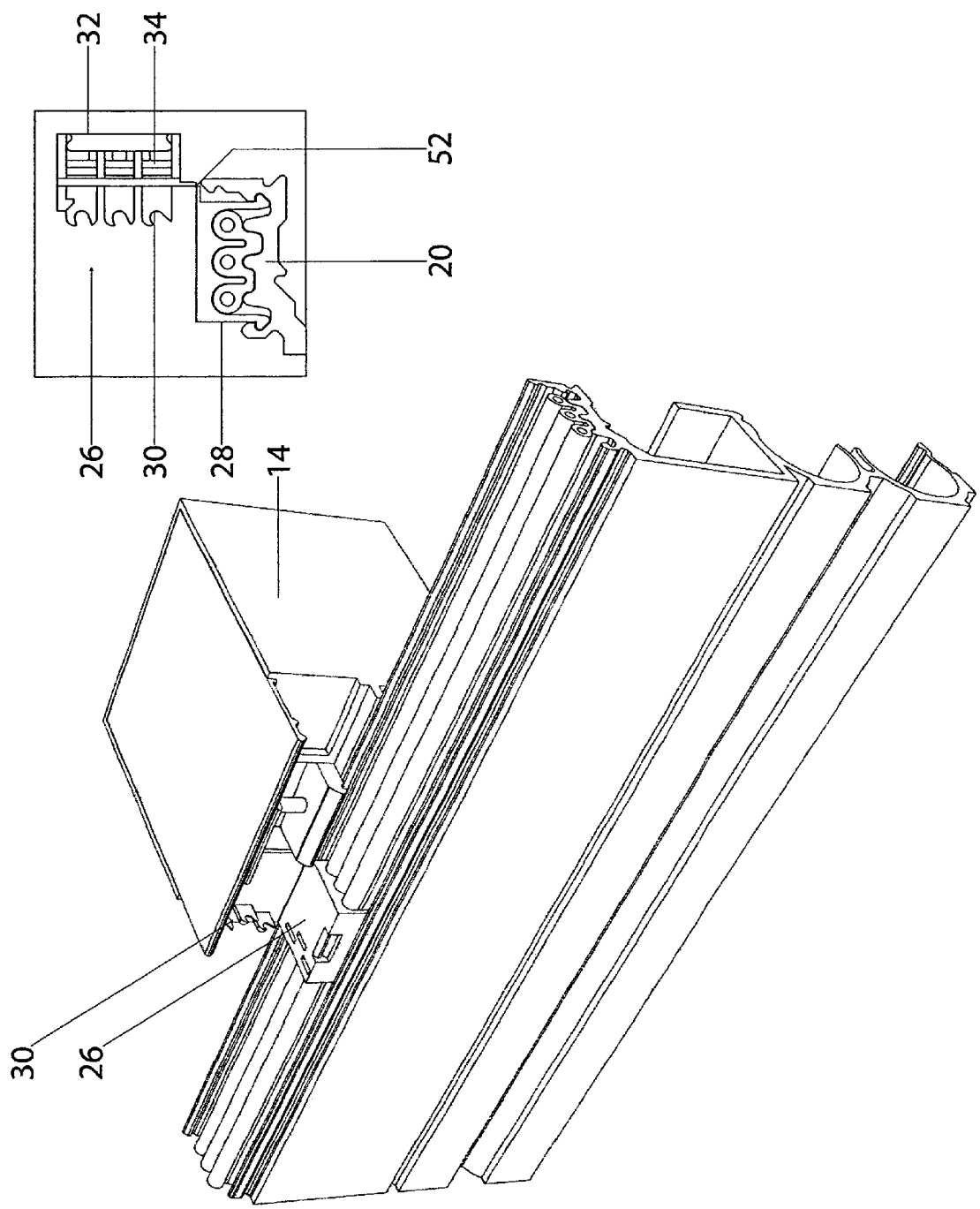
FIG. 5 an illustration similar to FIG. 3 with flat band cable and positioned electrical socket prior to its attachment.

In which way this is carried out can be seen best in FIG. 5. Since the insulation piercing connector 26 with its first part 28 is positioned fixedly on the cable strands 40 of the flat cable 12, there is already a latching securing action provided with the bottom side 20 of the first channel 16 in this way.

There is, of course, a plurality of ways to join the two parts 28 and 32 of the insulation piercing connector 26. It has been found to be particularly advantageous however when the two parts 28 and 32 are connected by means of a film hinge 52 so that the insulation piercing connector 26 can already be connected with the electrical socket 14, namely in that the second part 32 is inserted into appropriate contact pins 34 which are located within the electrical socket 14. These contact pins 34 contact the insulation piercing contacts 30 which are pointing in the direction of the first part 28.

Figure 6:
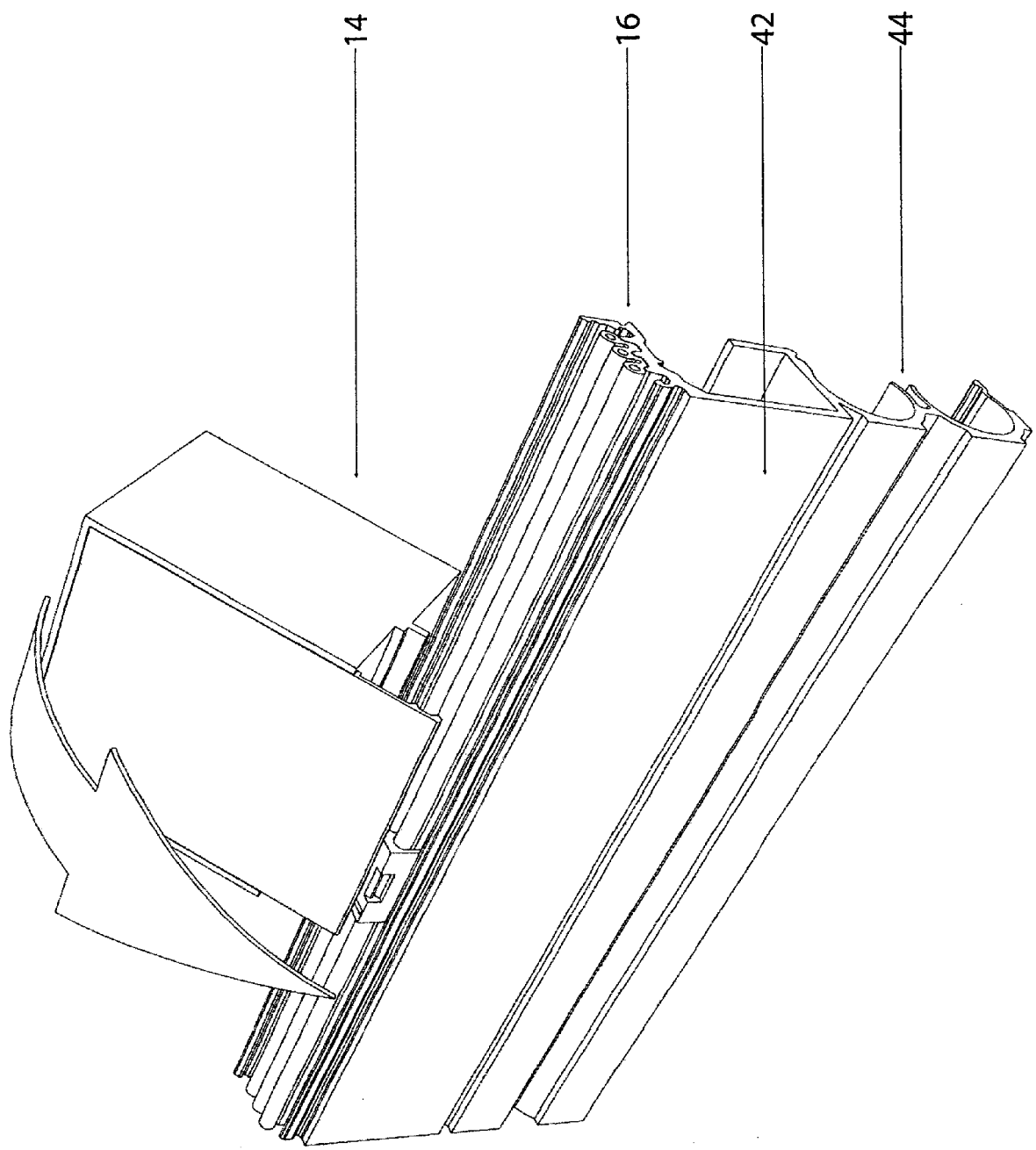
FIG. 6 an illustration similar to FIG. 5, however during movement for attachment of the electrical socket, in this case a rotational movement.

When now the housing or the electrical socket 14 according to FIG. 5 and FIG. 6 is folded out of the paper plane, the film hinge 52 serves as an exact guiding device so that the insulation piercing contacts 30 that in this case are all designed in a fork shape will impinge exactly on the appropriate cable strands 40 and surround them with their fork-like tip. Upon this engagement action, the fork-like ends of the insulation piercing contacts 30 cut open the installation of the cable strands 40 of the flat cable 12 and push so strongly into the electrically conducting leads of the cable strands 40 that a safe contact is produced.

When the second part 32 together with the electrical socket 14 is completely joined with the first part 28 of the insulation piercing connector 26, then these two first and second parts 28 and 32 are now irreversibly latched.

This not only serves safety issues, primarily after disassembly of the electrical socket 14, but also to a certain extent imparts strength to the electrical socket 14 on the first channel 16.

In this context, the insulation piercing connector 26 is no irreversibly connected with the channel 16.

Since the non-piercing ends of the insulation piercing connector 26 within the second part 32 are electrically connected detachably by means of contact pins 34 arranged within the electrical socket 14, it is advantageous to provide the electrical socket 14 with a fastening profile 36 for increasing the strength of the attachment force.

This fastening profile 36 forms also the two described different embodiments. It is indeed possible, and also illustrated in the Figures, that the electrical socket 14 is provided with the fastening profile connectable with the channel 16 or that either supports or at least partially receives an electrical socket housing 38 in its interior, wherein the surface of the electrical socket housing 38 facing in the channel direction are without a fastening profile.

Accordingly, on the one hand, the fastening profile 36 is located within the electrical socket housing 38. On the other hand, in the second embodiment the fastening profile 36 essentially receives the electrical socket 14 or its housing in its interior and only the end faces which are pointing in the cable direction are without this fastening profile 36.

Figure 7:
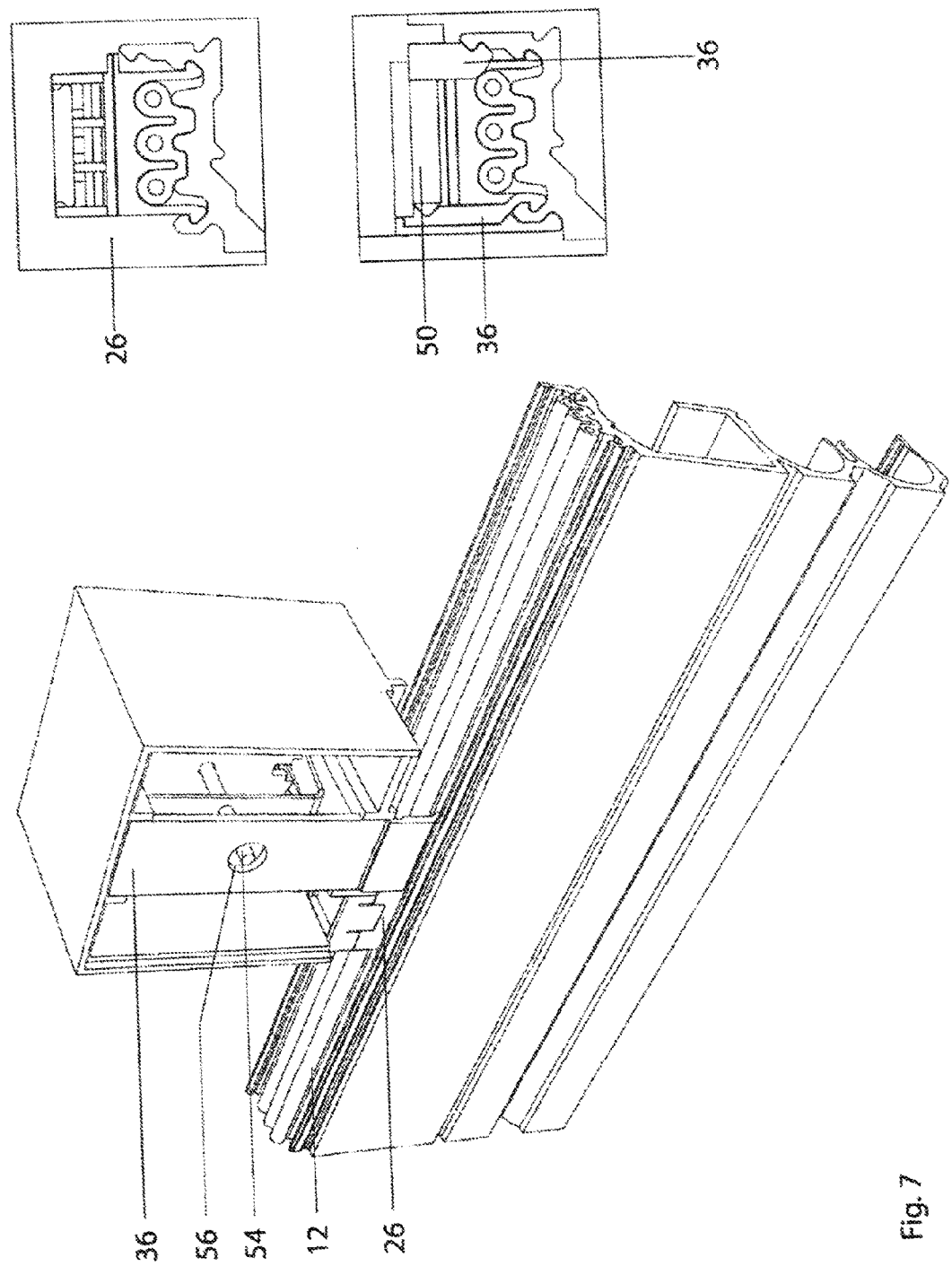
FIG. 7 the end position of the fastening movement according to FIG. 6 with two additional cross-sectional views, once inside and once outside of the fastening profile.
Figure 8:
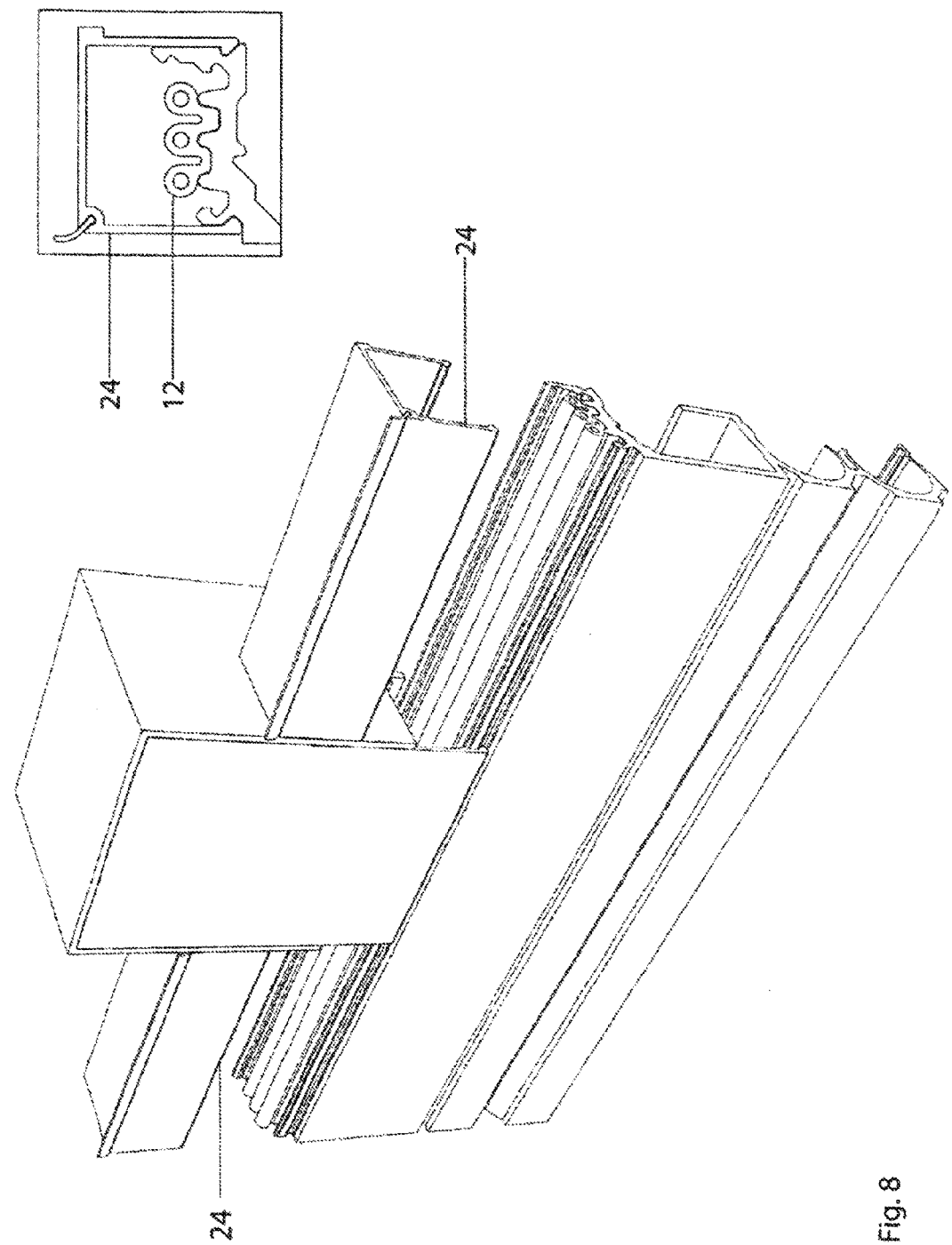
FIG. 8 a perspective view of the attached electrical socket prior to the upper cover being attached, the cover is illustrated in the cross-sectional illustration.

The irreversible latching action is shown moreover in FIG. 7 and particularly clearly shown in the lower smaller cross-sectional detail view thereof. Of course, there are several different ways to ensure this irreversible latching action. The illustrated latching action serves only as an example therefor.

Moreover, the pivot direction is also not mandatory. Of course, the pivoting action of the housing or of the electrical socket 14 can be realized from the right side or from the left side, viewed in longitudinal direction. However, care must be taken that then the insulation piercing connector also requires the film hinge 52 at a different location.

The greatest special feature of the described embodiments of two channel systems 10 resides in that the electrical socket 14 is removable from the channel 16, the second part 32 remains irreversibly latched with the first part 28 and covers the ends of the insulation piercing contacts 30 which are facing away from the flat cable 12. Accordingly, after removal of the electrical socket 14 the insulation piercing connector 26 remains essentially as a "bandage" so that touching the insulation piercing contacts is no longer possible.

Figure 10:
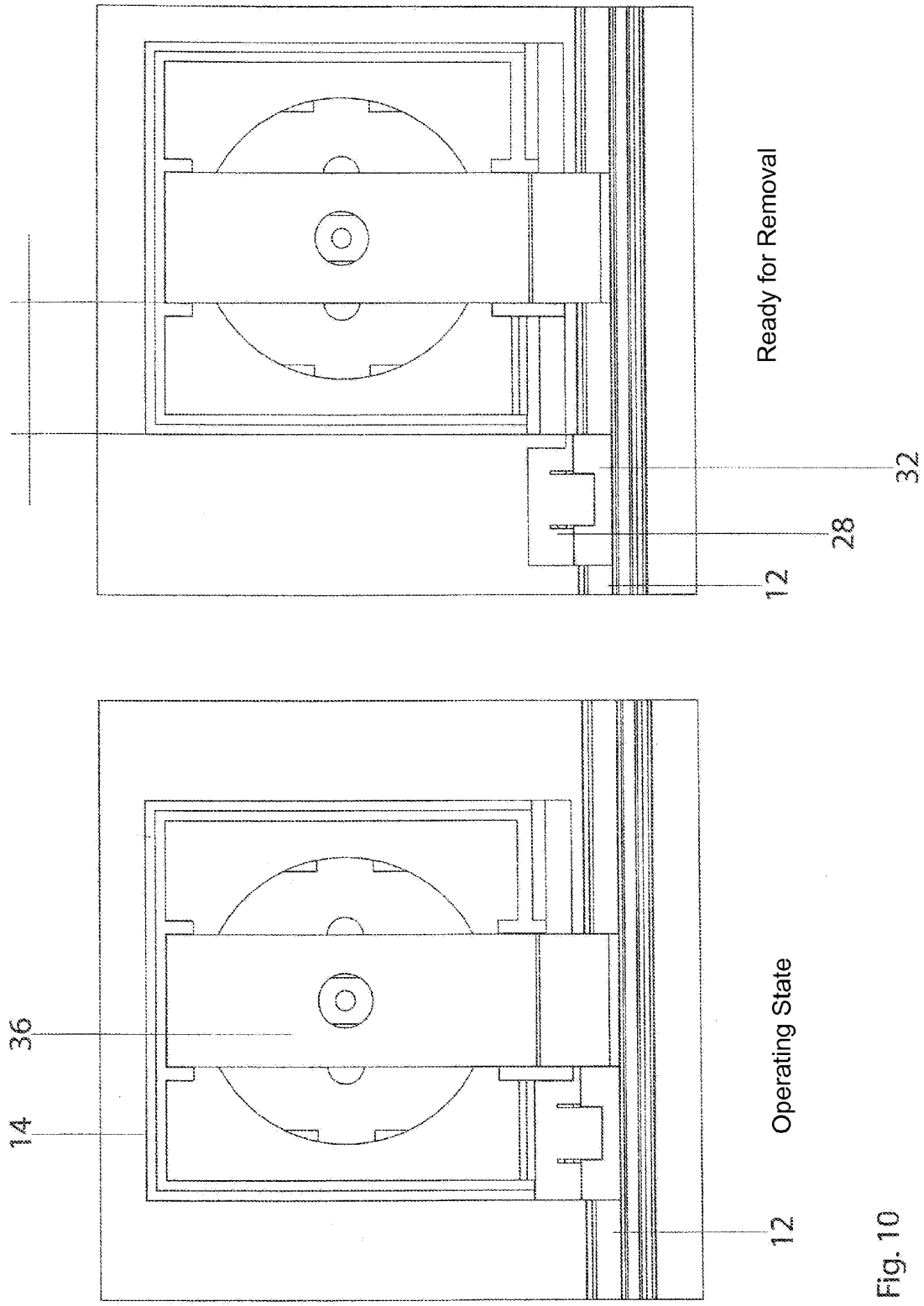
FIG. 10 two views showing the electrical socket in the mounted state and in the state demounted from flat cable or the insulation piercing connector, respectively.
Figure 11:
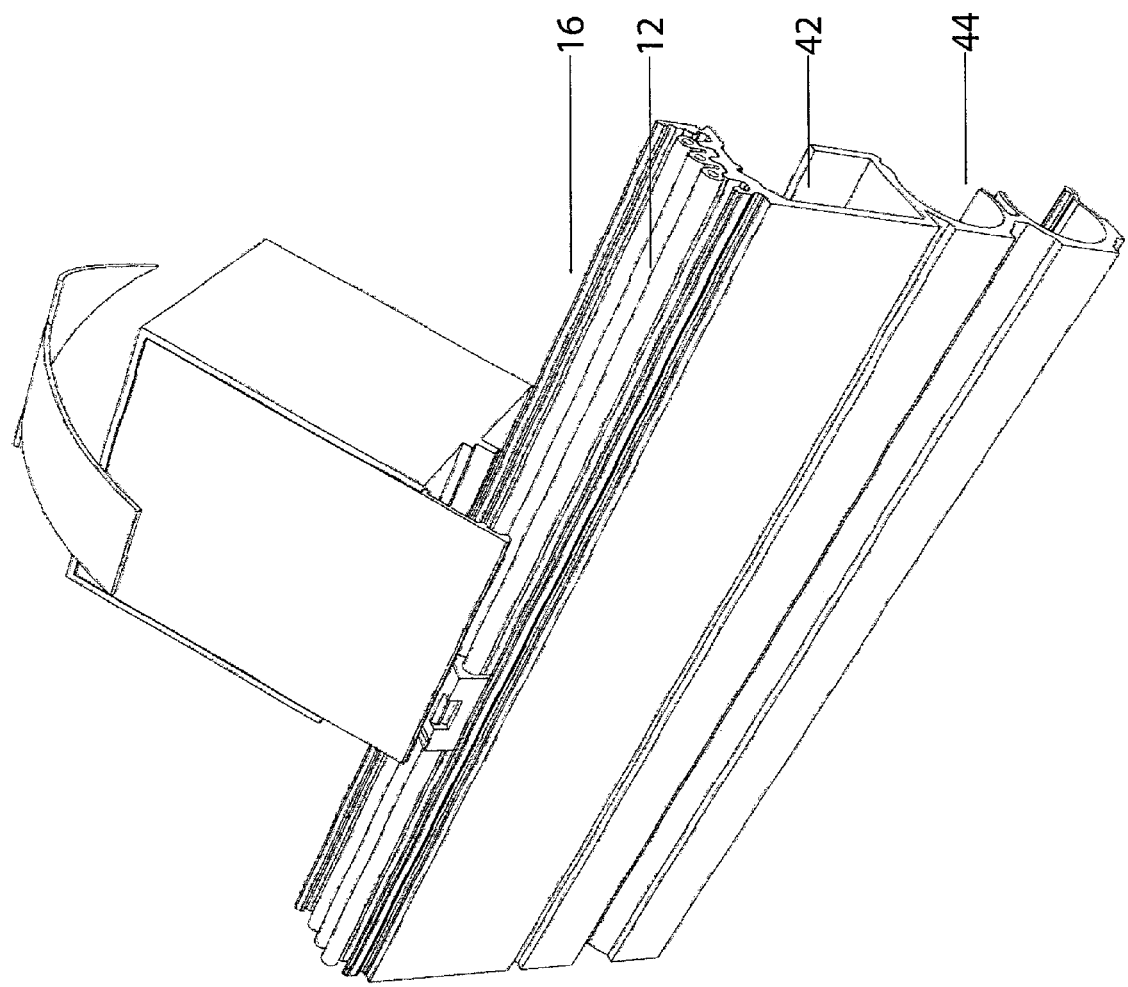
FIG. 11 a view similar to FIG. 6, however with the electrical socket being folded away from the first channel.
Figure 12:
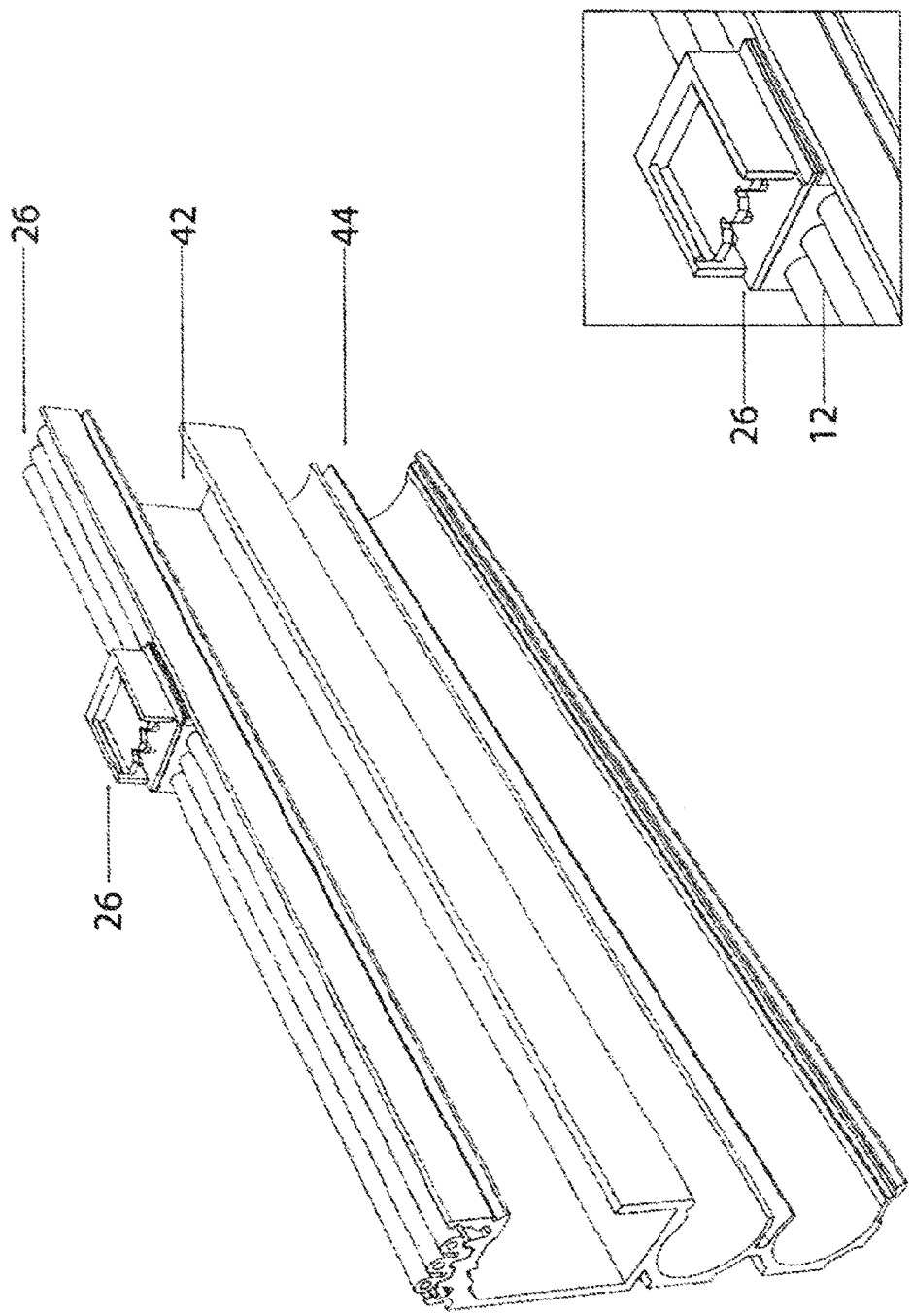
FIG. 12 the final situation after the pivot movement according to FIG. 11 with individual illustration of the insulation piercing connector which is serving as a protection and is staying behind.
Figure 13:
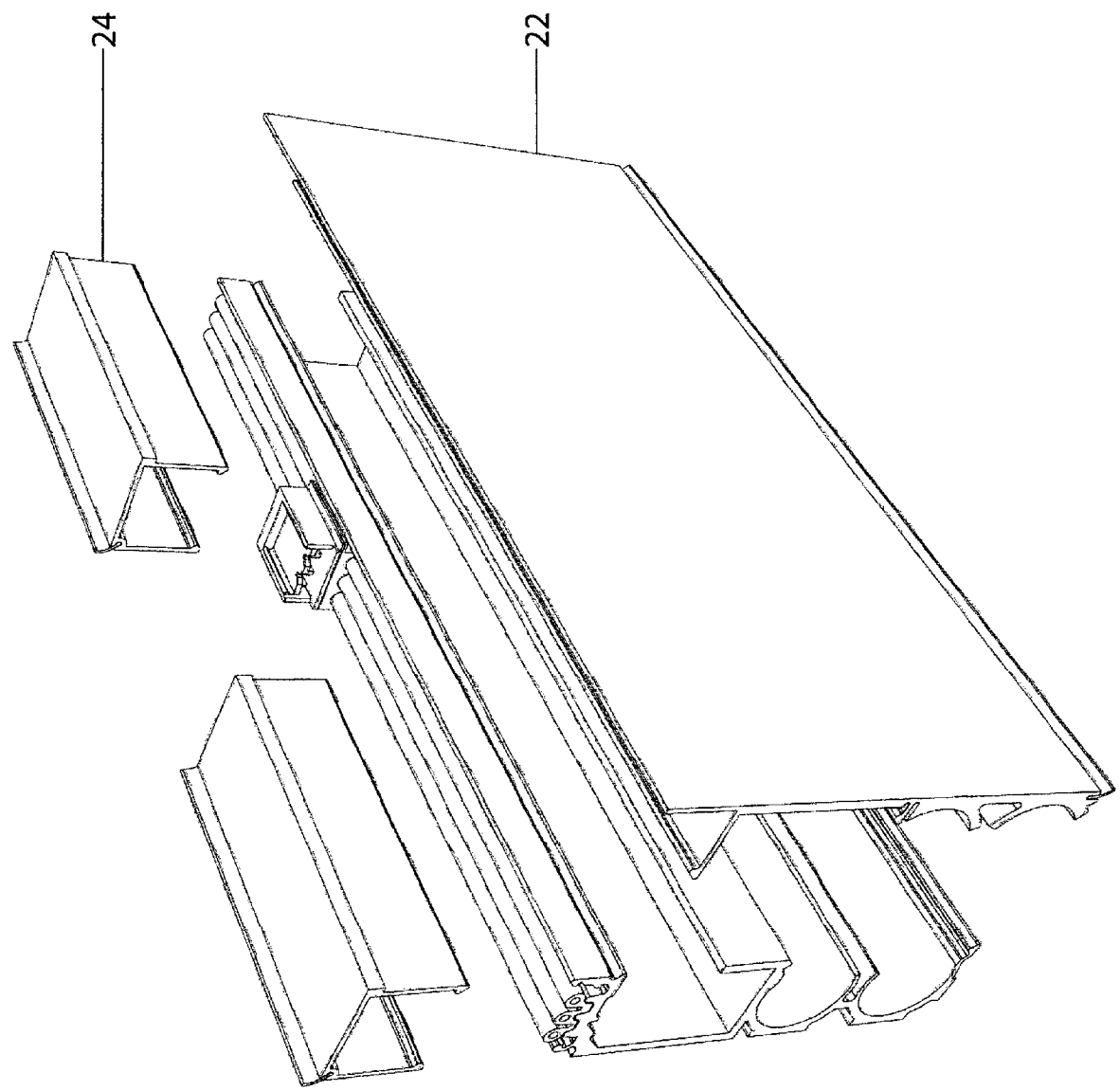
FIG. 13 an illustration similar to FIG. 12 prior to the upper cover and the front cover being latched for closing the channel system.
Figure 14:
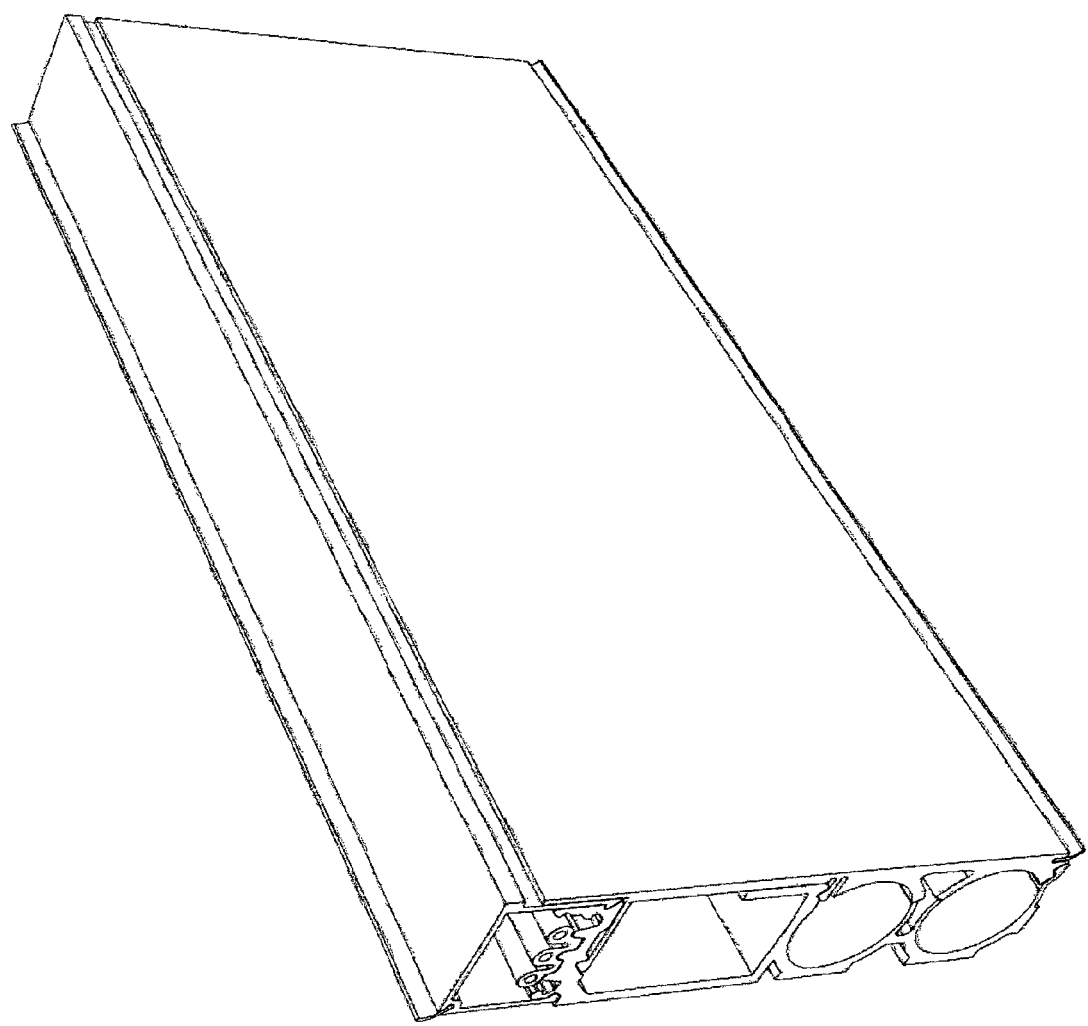
FIG. 14 the final state after latching of the individual parts according to FIG. 13.

A further advantage of this remaining insulation piercing connector 26 resides however also in that this insulation piercing connector that has been positioned and irreversibly latched once can again be provided with an electrical socket 14 which then must be manipulated opposite to the movements illustrated in FIG. 10.

Once the electrical socket 14 has been mounted completely, the upper covers 24 to the right and to the left of the electrical socket 14 can be pushed onto the bottom side 20 of the first channel 16 and therefore form with its three flanks a completely enclosed first channel 16.

As a final step, now the front cover 22 is then detachably latched with, in this case, first to fourth channels 16, 42, and 44. The type of latching action which has been selected in this embodiment is also illustrated in cross-section in FIG. 9.

Moreover, it should be noted that, for increasing the strength, the fastening profile 36 in the first channel 16 is braced by means of a securing screw 50. In this way, a securing action of the connecting housing on the channel profile by spreading apart the securing bracket or the fastening profile 36 at the level of the cable strands 40 exists. This is a mechanical securing action of the connecting housing or of the electrical socket 14 with a pointed securing screw 50 so that the latter grounds the connecting housing, namely in a single working step also the metallic connecting bracket on the profile in that, for example, the anodized layer is penetrated.

Figure 9:
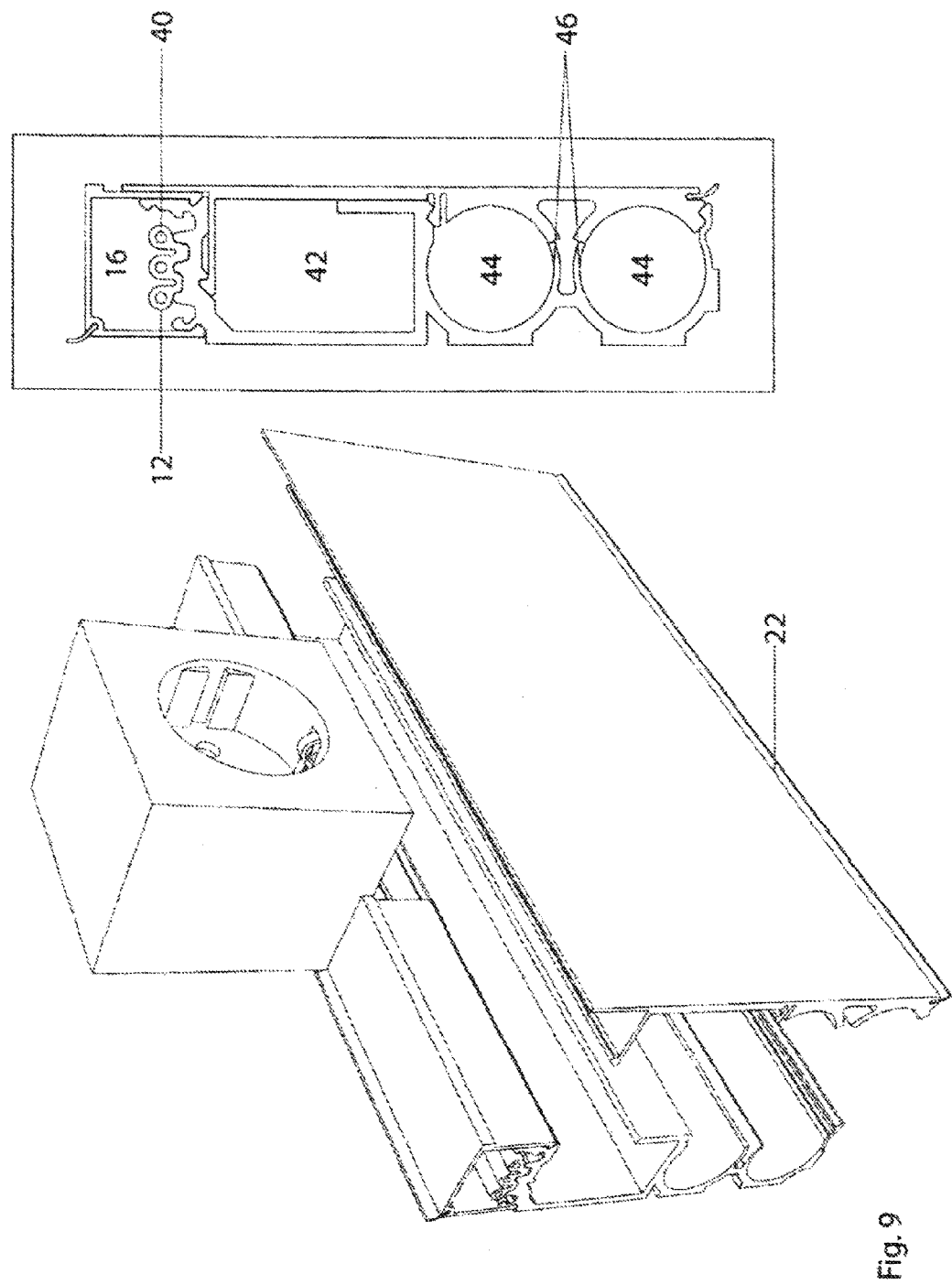
FIG. 9 a perspective view similar to FIG. 8, viewed from the electrical socket side, shortly before the front cover is latched, whose end position is shown in the cross-sectional view.

Also, as shown in particular in FIG. 9, it is apparent that the cable system 10 can be comprised of up to three channels 16, 42, and 44. The second channel 42 serves for receiving audio, video and CAT conduits, for example, speaker cables, antenna cables, telephone cables etc. The second channel 42 is also detachably closable by the front cover 22.

Moreover, in the Figures it is illustrated that the channel system 10 has a third channel 44 which in its interior is provided with securing elements 46 for heating conduits 48. This third channel 44 adjoins either the first channel 16 or the second channel 42. It is thus not necessary that always three channels must be present.

Moreover, in the illustrated embodiments it is provided that the first channel 16 is monolithically formed either with the second channel 42 or/and with the third channel 44.

As a material for the channel system either metal, plastic material or a combination thereof can be used. This does not apply, of course, to the flat cable 12 because the latter always comprises a combination of metal and plastic material.

By means of the channel system 10 according to the invention, a simple, easily installed multi-use solution is provided for installing simply and easily up to three channels for electric current, audio, video, and heating and primarily for retrofitting by surface mounting wherein the greatest degree of freedom resides in that an electrical socket 14 can be mounted at any desired location.

List Of Reference Characters 10 channel system
12 flat cable
14 electrical socket
15 rearward housing wall
16 first channel
18 rearward side
20 bottom side
21 front side
22 front cover
24 upper cover
26 insulation piercing connector
28 first part
30 insulation piercing contact
32 second part
34 contact pin
36 fastening profile
38 electrical socket housing
40 cable strand
42 second channel
44 third channel
46 securing elements
48 heating conduits
50 securing screw
52 film hinge
54 central screw
56 screw sleeve
58 housing

The invention claimed is:

1. A channel system comprising:
    a first channel comprising a rearward side, a bottom side, and a front side;
    a multicore flat cable arranged inside the first channel;
    an electrical socket detachably mounted on the first channel;
    a detachably attached upper cover which is removed in an area where the electrical socket is mounted on the first channel;
    an insulation piercing connector establishing an electrical contact between the multicore flat cable and the electrical socket;
    the insulation piercing connector comprising a first part resting on the multicore flat cable and further comprising a second part, the second part arranged on the electrical socket and comprising insulation piercing contacts.

2. The channel system according to claim 1, further comprising a front cover detachably connected to the first channel.

3. The channel system according to claim 1, wherein the insulation piercing connector is connected irreversibly within the first channel.

4. The channel system according to claim 1, wherein the second part of the insulation piercing connector comprises non-piercing ends that are detachably electrically connected to contact pins arranged within the electrical socket.

5. The channel system according to claim 1, wherein the second part of the insulation piercing connector is latched irreversibly with the first part of the insulation piercing connector after the electrical socket has been pivoted in a pivot movement from an initial unmounted position in a direction of the first channel into a mounted position on the first channel and after the insulation piercing contacts have pierced the multicore flat cable during the pivot movement to establish electrical contact.

6. The channel system according to claim 5, wherein the pivot movement of the electrical socket for mounting is clockwise or counterclockwise in a direction of the longitudinal axis of the channel or is transverse to the direction of the longitudinal axis of the channel.

7. The channel system according to claim 1, wherein the insulation piercing contacts have ends that are facing away from the multicore flat cable, wherein the electrical socket is mounted on the first channel in a mounted position so as to be removable from the first channel, wherein the second part of the insulation piercing connector remains irreversibly latched with the first part of the insulation piercing connector in a latched position when the electrical socket is removed from the mounted position on the first channel, and wherein the second part of the insulation piercing connector covers in the latched position said ends of the insulation piercing contacts.

8. The channel system according to claim 1, wherein the electrical socket comprises a fastening profile that is connectable with the first channel and that either supports or at least partially receives an electrical socket housing in an interior of the fastening profile, wherein the surfaces of the electrical socket housing pointing in a length direction of the first channel are not provided with the fastening profile.

9. The channel system according to claim 8, wherein the fastening profile is braced by a securing screw in the first channel.

10. The channel system according to claim 1, wherein the bottom side comprises a profile and the multicore flat cable comprises a facing side that is facing the profile of the bottom side, wherein the facing side has a matching negative profile relative to the profile of the bottom side so that the multicore flat cable can be joined only in a predetermined orientation with the bottom side so that an arrangement of adjacently positioned cable strands of the multicore flat cable is always the same in the first channel.

11. The channel system according to claim 1, further comprising a second channel extending away from the bottom side in a direction opposite to the upper cover.

12. The channel system according to claim 11, further comprising a front cover detachably connected to the first channel and the second channel and closing off the second channel.

13. The channel system according to claim 11, wherein the first channel is monolithically formed with the second channel; with the third channel; or with the second channel and the third channel.

14. The channel system according to claim 1, wherein the first part of the insulation piercing connector is connected by a film hinge to the second part of the insulation piercing connector.

15. The channel system according to claim 1, comprised of metal, plastic material, or a combination thereof.

16. The channel system according to claim 11, further comprising a third channel comprising an interior provided with securing elements adapted to receive heating conduits, wherein the third channel adjoins either the first channel or the second channel.

* * * * *